US011485311B2

(12) United States Patent
Yamabe et al.

(10) Patent No.: US 11,485,311 B2
(45) Date of Patent: Nov. 1, 2022

(54) SIDE AIRBAG DEVICE AND METHOD FOR MANUFACTURING SAME

(71) Applicant: TS TECH CO., LTD., Asaka (JP)

(72) Inventors: Atsushi Yamabe, Tochigi (JP); Daisuke Kuriyama, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/762,828

(22) PCT Filed: Sep. 26, 2018

(86) PCT No.: PCT/JP2018/035637
§ 371 (c)(1),
(2) Date: May 8, 2020

(87) PCT Pub. No.: WO2019/093002
PCT Pub. Date: May 16, 2019

(65) Prior Publication Data
US 2021/0268985 A1 Sep. 2, 2021

(30) Foreign Application Priority Data

Nov. 9, 2017 (JP) .............................. JP2017-216312
Nov. 9, 2017 (JP) .............................. JP2017-216313
Nov. 9, 2017 (JP) .............................. JP2017-216314

(51) Int. Cl.
B60R 21/207 (2006.01)
B60R 21/21 (2011.01)
B60R 21/217 (2011.01)

(52) U.S. Cl.
CPC ............ B60R 21/207 (2013.01); B60R 21/21 (2013.01); B60R 21/2171 (2013.01); B60R 2021/2078 (2013.01)

(58) Field of Classification Search
CPC .................. B60R 21/207; B60R 21/21; B60R 2021/2078; B60R 21/2171; B60R 2021/0006
See application file for complete search history.

(56) References Cited

U.S. PATENT DOCUMENTS 5,257,815 A 11/1993 Bachelder et al.
5,458,362 A 10/1995 Buchanan et al.
(Continued)

FOREIGN PATENT DOCUMENTS

FR 2917356 12/2008
JP H09315254 12/1997
(Continued)

OTHER PUBLICATIONS

Extended European Search Report issued for European Patent Application No. 18876370.0, dated Sep. 10, 2020, 7 pages.
(Continued)

Primary Examiner — James A English
Assistant Examiner — Matthew D Lee
(74) Attorney, Agent, or Firm — Hamre, Schumann, Mueller & Larson, P.C.

(57) ABSTRACT

A side airbag device with a base member for an inflator to be easily fixed thereto, and a method for manufacturing same is provided. The side airbag device includes: an airbag; an inflator configured to supply the airbag with gas; a base member configured to accommodate the airbag and the inflator, and to be fixed to a vehicle body; an outer covering member configured to cover at least a front side of the base member to form a front-facing interior surface; and a mounting bracket. The mounting bracket includes an inflator fixing portion to which the inflator is fixed and a base member fixing portion which is located in a position different from a position of the inflator fixing portion and fixed to the base (Continued)

member. The base member includes, at a left or right side portion thereof, a bracket fixing portion to which the mounting bracket is fixed.

10 Claims, 9 Drawing Sheets

(56) References Cited

U.S. PATENT DOCUMENTS

| | | | |
|---|---|---|---|
| 5,501,484 A | 3/1996 | Saderholm et al. | |
| 5,533,750 A | 7/1996 | Karlow et al. | |
| 5,556,127 A * | 9/1996 | Hurford | B60R 21/201 |
| | | | 280/728.2 |
| 5,564,735 A | 10/1996 | Boy et al. | |
| 5,601,332 A | 2/1997 | Schultz et al. | |
| 5,667,241 A | 9/1997 | Bunker et al. | |
| 5,687,987 A | 11/1997 | Spencer et al. | |
| 5,890,733 A | 4/1999 | Dillon | |
| 5,911,434 A | 6/1999 | Townsend | |
| 5,947,630 A | 9/1999 | Dillon | |
| 5,967,546 A | 10/1999 | Homier et al. | |
| 5,967,547 A | 10/1999 | Narita et al. | |
| 5,992,878 A | 11/1999 | Narita et al. | |
| 6,007,089 A | 12/1999 | Götz et al. | |
| 6,092,832 A | 7/2000 | Worrell et al. | |
| 6,126,192 A | 10/2000 | Enders | |
| 6,129,419 A | 10/2000 | Neale | |
| 6,196,577 B1 | 3/2001 | Aoki et al. | |
| 6,237,936 B1 | 5/2001 | Quade et al. | |
| 6,402,240 B1 | 6/2002 | Toba et al. | |
| 6,439,597 B1 | 8/2002 | Harada et al. | |
| 6,457,741 B2 | 10/2002 | Seki et al. | |
| 6,578,911 B2 | 6/2003 | Harada et al. | |
| 6,857,655 B2 | 2/2005 | Müller et al. | |
| 6,976,700 B2 | 12/2005 | McCann et al. | |
| 7,048,297 B2 | 5/2006 | Schneider | |
| 7,204,510 B2 | 4/2007 | Bossenmaier et al. | |
| 7,216,934 B1 | 5/2007 | Kobari | |
| 7,232,150 B2 | 6/2007 | Nagayama | |
| 7,267,363 B2 | 9/2007 | Tredez | |
| 7,370,879 B2 | 5/2008 | Hotta et al. | |
| 7,490,899 B2 | 2/2009 | McMillen | |
| 7,530,595 B2 | 5/2009 | Naruse et al. | |
| 7,604,250 B2 | 10/2009 | Hotta et al. | |
| 7,654,555 B2 | 2/2010 | Schaupp et al. | |
| 7,654,556 B2 | 2/2010 | Vigeant et al. | |
| 7,661,697 B2 | 2/2010 | Itoga | |
| 7,669,888 B2 | 3/2010 | Sato et al. | |
| 7,677,594 B2 | 3/2010 | Hazlewood et al. | |
| 7,699,340 B2 | 4/2010 | Okuhara et al. | |
| 7,753,407 B2 | 7/2010 | Yokota | |
| 7,798,519 B2 | 9/2010 | Kawabe et al. | |
| 7,850,196 B2 | 12/2010 | Kashiwagi | |
| 7,862,078 B2 | 1/2011 | Yokota | |
| 7,905,307 B2 | 3/2011 | Kubota et al. | |
| 7,938,436 B2 | 5/2011 | Lunt et al. | |
| 8,123,246 B2 | 2/2012 | Gilbert et al. | |
| 8,146,942 B2 | 4/2012 | Bruning et al. | |
| 8,172,257 B2 | 5/2012 | Wandtke et al. | |
| 8,196,954 B2 | 6/2012 | Choi | |
| 8,226,113 B2 | 7/2012 | Yamashita | |
| 8,316,516 B2 | 11/2012 | Hoehe et al. | |
| 8,454,050 B2 | 6/2013 | Schorle et al. | |
| 8,469,392 B2 | 6/2013 | Shankar | |
| 8,528,934 B2 | 9/2013 | Kobayshi et al. | |
| 8,534,701 B2 | 9/2013 | Sosnowski et al. | |
| 8,596,674 B2 | 12/2013 | Fukawatase et al. | |
| 8,622,422 B1 | 1/2014 | Thomas et al. | |
| 8,628,111 B2 | 1/2014 | Sugimoto et al. | |
| 8,651,518 B2 | 2/2014 | Shamoto et al. | |
| 8,662,531 B2 | 3/2014 | Tracht | |
| 8,684,399 B2 | 4/2014 | Honda et al. | |
| 8,733,832 B2 | 5/2014 | Fukawatase | |
| 8,746,732 B1 | 6/2014 | Kutchey et al. | |
| 8,752,861 B2 | 6/2014 | Fukawatase et al. | |
| 8,764,049 B2 | 7/2014 | Lusk et al. | |
| 8,807,591 B2 | 8/2014 | Nakata | |
| 8,955,877 B2 | 2/2015 | Broussard et al. | |
| 8,986,046 B2 | 3/2015 | Smith et al. | |
| 8,998,248 B2 | 4/2015 | Shankar et al. | |
| 9,022,415 B2 | 5/2015 | Kim et al. | |
| 9,278,662 B2 | 3/2016 | Hotta et al. | |
| 9,296,352 B2 | 3/2016 | Fujiwara et al. | |
| 9,346,432 B2 | 5/2016 | Sugimoto et al. | |
| 9,415,739 B2 | 8/2016 | Mihm et al. | |
| 9,463,768 B2 | 10/2016 | Tanabe et al. | |
| 9,469,258 B1 | 10/2016 | Rickenbach et al. | |
| 9,539,975 B2 | 1/2017 | Tanabe et al. | |
| 9,545,891 B2 | 1/2017 | Tanabe | |
| 9,598,040 B2 | 3/2017 | Tanabe et al. | |
| 9,616,791 B2 | 4/2017 | Awata et al. | |
| 9,630,584 B2 | 4/2017 | Fujiwara et al. | |
| 9,688,230 B2 | 6/2017 | Makita | |
| 9,896,053 B2 | 2/2018 | Tanabe et al. | |
| 9,994,183 B2 | 6/2018 | Fujiwara | |
| 10,005,418 B2 | 6/2018 | Ito et al. | |
| 10,059,297 B2 | 8/2018 | Tanabe et al. | |
| 10,272,870 B2 | 4/2019 | Festag | |
| 10,384,634 B2 | 8/2019 | Wiscombe et al. | |
| 10,399,533 B2 | 9/2019 | Yoshikai et al. | |
| 10,730,471 B2 | 8/2020 | Nakano | |
| 10,737,654 B2 | 8/2020 | Ono et al. | |
| 10,773,673 B2 | 9/2020 | Bachmann et al. | |
| 10,800,369 B2 | 10/2020 | Hioda | |
| 10,864,880 B2 | 12/2020 | Ross et al. | |
| 10,994,686 B2 | 5/2021 | Inoue et al. | |
| 2002/0084630 A1 | 7/2002 | Aulbach | |
| 2004/0239080 A1 | 12/2004 | Berrahou et al. | |
| 2005/0029784 A1 | 2/2005 | Siegel et al. | |
| 2005/0161927 A1 | 7/2005 | Yokoyama et al. | |
| 2006/0006630 A1 | 1/2006 | Schwarz | |
| 2006/0061073 A1 | 3/2006 | Naruse et al. | |
| 2007/0182131 A1 | 8/2007 | Helbig et al. | |
| 2008/0007035 A1 | 1/2008 | Acker et al. | |
| 2008/0084051 A1 | 4/2008 | Okuhara et al. | |
| 2009/0039623 A1 | 2/2009 | Kawabe et al. | |
| 2009/0039627 A1 | 2/2009 | Yokota | |
| 2009/0152838 A1 | 6/2009 | Robins | |
| 2010/0181746 A1 * | 7/2010 | Rose | B60R 21/2171 |
| | | | 280/736 |
| 2010/0253050 A1 | 10/2010 | Mitsuo et al. | |
| 2013/0175792 A1 * | 7/2013 | Fukawatase | B60N 2/289 |
| | | | 280/728.2 |
| 2014/0197621 A1 | 7/2014 | Thomas | |
| 2015/0061266 A1 | 3/2015 | Jordan et al. | |
| 2015/0076802 A1 | 3/2015 | Tanabe et al. | |
| 2015/0151711 A1 | 6/2015 | Fujiwara | |
| 2015/0166185 A1 * | 6/2015 | Oleson | B60N 2/4235 |
| | | | 297/216.1 |
| 2015/0266445 A1 | 9/2015 | Kojima | |
| 2015/0367805 A1 | 12/2015 | Santi et al. | |
| 2016/0009247 A1 * | 1/2016 | Fujiwara | B60R 21/2171 |
| | | | 280/728.2 |
| 2016/0009248 A1 | 1/2016 | Tanabe et al. | |
| 2016/0244018 A1 | 8/2016 | Zimmermann | |
| 2016/0288838 A1 | 10/2016 | Kindaichi et al. | |
| 2016/0325646 A1 | 11/2016 | Tanabe et al. | |
| 2017/0036635 A1 * | 2/2017 | Tanabe | B60N 2/986 |
| 2017/0066400 A1 | 3/2017 | Fujiwara | |
| 2017/0066402 A1 | 3/2017 | Fujiwara | |
| 2018/0022304 A1 | 1/2018 | Yoshikai et al. | |
| 2018/0118149 A1 | 5/2018 | Odai et al. | |
| 2019/0202390 A1 | 7/2019 | Ono et al. | |
| 2020/0369233 A1 * | 11/2020 | Kuriyama | B60R 21/21 |

FOREIGN PATENT DOCUMENTS

| | | | | |
|---|---|---|---|---|
| JP | H1035392 | | 2/1998 | |
| JP | H1148902 | | 2/1999 | |
| JP | H11192914 | | 7/1999 | |
| JP | 2009040328 A | * | 2/2009 | |
| JP | 5408360 | | 2/2014 | |

(56) References Cited

FOREIGN PATENT DOCUMENTS

| JP | 2016020140 | 2/2016 | | |
|----|------------|--------|---|---|
| JP | 2016037140 | 3/2016 | | |
| JP | 2016037141 | 3/2016 | | |
| JP | 2017047861 | 3/2017 | | |
| JP | 2017087949 | 5/2017 | | |
| WO | WO-2014171531 A1 * | 10/2014 | ........... | B60R 21/216 |
| WO | WO-2014208666 A1 * | 12/2014 | ........... | B60R 21/207 |
| WO | 2017103368 | 6/2017 | | |

OTHER PUBLICATIONS

International Search Report issued for International Patent Application No. PCT/JP2018/035637, dated Dec. 11, 2018, 3 pages including English translation.
Written Opinion issued for International Patent Application No. PCT/JP2018/035637, dated Dec. 11, 2018, 7 pages including English translation.
International Search Report issued for International Patent Application No. PCT/JP2018/035636, dated Dec. 11, 2018, 4 pages including English translation.
Written Opinion issued for International Patent Application No. PCT/JP2018/035636, dated Dec. 11, 2018, 7 pages including English translation.
U.S. Appl. No. 16/762,817, filed May 8, 2020, Kuriyama.
Office Action issued for Japanese Patent Application No. 2017-216305, dated Jun. 8, 2021, 6 pages including English translation.
Office Action issued for Chinese Patent Application No. 201880072151.4, dated Nov. 1, 2021, 16 pages including English translation.

* cited by examiner (a)

(b)

(c)

SIDE AIRBAG DEVICE AND METHOD FOR MANUFACTURING SAME

TECHNICAL FIELD

The present invention relates to a side airbag device disposed between a vehicle body and a seat, and a method for manufacturing the same.

BACKGROUND ART

A side airbag device disposed between a seat of a vehicle and a sidewall of a vehicle body, and configured to deploy toward a side space of an occupant in a broadside collision of the vehicle is known in the art. The side airbag device includes an inflator configured to cause gases to issue which in turn cause an airbag to deploy. The inflator typically has a bolt integrated therewith, and this bolt is oriented in a rearward direction of the seat and fastened to a mount portion of the vehicle body or a seat frame located at the rear side of the inflator (e.g., see Patent document 1).

In the side airbag device of Patent document 1, a module case in which the inflator and the airbag are housed includes an inner portion and an outer portion extending frontward at the left and right sides of the inflator and thus enclosing the inflator.

CITATION LIST

Patent Literature

Patent document 1: JP 5408360 B2

SUMMARY OF INVENTION

In some cases, where the base member accommodating the inflator and the airbag is surrounded as in a box with a case or a cushion pad, the base member may be difficult for the inflator to be fixed thereto.

It would be desirable that the fixing of the inflator to the base member be made easier, thereby improving the ease of assembly of the side airbag device.

For the side airbag device, typically, it would seem to be desirable that the airbag be caused to deploy stably along the sidewall of the vehicle body, and that the airbag be restrained from rapidly and violently inflating for deployment. Furthermore, the side airbag device configured to be compact in size would be desirable.

Against the backdrop of these circumstances, a new form of a side airbag device disposed between a vehicle body and a seat is proposed. A side airbag device disclosed herein, in one aspect, comprises: an airbag; an inflator configured to supply the airbag with gas; a base member configured to accommodate the airbag and the inflator, and to be fixed to the vehicle body; an outer covering member configured to cover at least a front side of the base member to form a front-facing interior surface; and a mounting bracket which includes an inflator fixing portion to which the inflator is fixed and a base member fixing portion which is located in a position different from a position of the inflator fixing portion and fixed to the base member. The base member comprises, at a left or right side portion thereof, a bracket fixing portion to which the mounting bracket is fixed.

With this configuration, the inflator may be fixed to the mounting bracket to form a subassembly, of which the mounting bracket can thus be fixed to the base member by making use of the base member fixing portion; therefore, the mounting of the inflator to the base member can be performed with ease. Accordingly, the ease of assembly of the side airbag device can be improved.

In the above-described configuration, the inflator fixing portion may preferably be located closer, than the base member fixing portion, to the interior surface.

With this configuration in which the inflator fixing portion is located closer, than the base member fixing portion, to the interior surface, the airbag is made unlikely to get hitched on the base member fixing portion upon deployment, and thus allowed to deploy stably.

In the above-described configuration, the base member fixing portion may be located farther, than the inflator, away from the interior surface.

With this configuration, the base member fixing portion is in a position shifted rearward relative to a position of the inflator; thus, the mounting bracket can be fixed to the base member by making use of the base member fixing portion with ease.

In the above-described configuration, the inflator fixing portion may be located closer, than the base member fixing portion, to a center of the base member in a lateral direction.

This location of the inflator fixing portion closer to the center of the base member in the lateral direction would make it easy to have other members (such as a nut to be applied to a bolt for fastening the inflator) arranged on one side of the center of the base member in the lateral direction which side is opposite to a side on which the inflator fixing portion is located (the inner side in the lateral direction as defined with respect to the vehicle body).

In the above-described configuration, the inflator may comprise a plurality of bolts.

Herein, the inflator fixing portion may comprise a plurality of inflator fixing holes through which the plurality of bolts are disposed, respectively.

Fixing of the inflator by the use of a plurality of bolts as in this configuration makes it possible to fix the inflator stably.

In the above-described configuration, the base member fixing portion may comprise a plurality of base member fixing holes through which a plurality of fastening members are disposed, respectively.

With this configuration, the mounting bracket can be fixed more stably to the base member by the use of a plurality of fastening members.

In the above-described configuration, the base member may comprise an inner portion located laterally farther inward within the vehicle body relative to the airbag.

Herein, the mounting bracket may preferably be fixed to the inner portion.

With this configuration, the airbag is constrained at the inner portion to which the inflator is fixed, and thus tends to be forced to get inflated outward in the lateral direction as defined with respect to the vehicle body, i.e., on a side opposite to a side on which the inner portion is located. This makes the airbag likely to deploy along the sidewall of the vehicle body.

Where the inflator is fixed to the inner portion, the airbag may be made likely to inflate rearward of the seat. Therefore, even if a force produced upon deployment of the airbag is great, the airbag can be caused to inflate rearward to some extent, so that the airbag can be restrained from rapidly and violently inflating frontward for deployment.

The base member may preferably include a wire frame made of a metal rod.

The base member configured to include such a wire frame serves to provide the base member with increased rigidity; thus, the side airbag device can be configured to be compact in size.

The side airbag device may further comprise a cushion pad with which the base member is covered.

A method for manufacturing a side airbag device as described above may comprise the steps of: forming a cushion pad integrally with the base member; fixing the base member to the vehicle body; and fixing, to the base member, the mounting bracket to which the inflator is fixed.

With this manufacturing method, even after the base member is surrounded with the cushion pad as a result of forming the cushion pad integrally with the base member, the inflator can be fixed to the base member easily by fixing to the base member the mounting bracket to which the inflator is fixed.

Proposed as another aspect is a side airbag device with an inflator fixed to a vehicle body by a base member made of a wire frame which side airbag device is configured such that the airbag can be made unlikely to get hitched on the wire frame upon deployment, and thus regularity in shape alteration of the airbag upon deployment can be improved. A side airbag device disclosed herein comprises: an airbag; an inflator configured to supply the airbag with gas; and a base member having a storage space in which the airbag and the inflator are accommodated, which base member is to be fixed to the vehicle body. The base member includes a wire frame made of a metal rod, and a guide plate made of a metal plate which guide plate is located on a storage-space side of a front edge portion of the wire frame. The guide plate is fixed to the front edge portion of the wire frame.

With this configuration in which the guide plate is located on the storage-space side of the wire frame, the airbag can be made unlikely to get hitched on the wire frame, and thus allowed to deploy stably. Moreover, the guide plate may serve to reinforce the front edge portion of the wire frame, so that the rigidity of the base member can be enhanced. Furthermore, fixing of the guide plate to the front edge portion of the wire frame results in mutual reinforcement of the front edge portion of the guide plate and the front edge portion of the wire frame, and thus serves to enhance the rigidity of the front edge portion of the base member.

The side airbag device described above may be configured such that the base member comprises an outer portion located laterally farther outward within the vehicle body relative to the airbag, and the guide plate comprises a first guide plate provided along a front edge portion of the outer portion.

With this configuration, the front edge portion of the outer portion can be reinforced; therefore, the front edge portion can be made unlikely to become warped out of shape upon deployment of the airbag, so that the airbag can be caused to stably deploy frontward.

The first guide plate described above may preferably be provided along the length from an upper end to a lower end of the outer portion.

The first guide plate may preferably include, at a rear end portion thereof, a flange extending outward in a lateral direction as defined with respect to the vehicle body.

With this configuration in which the first guide plate includes a flange extending outward in the lateral direction, even when deployment of the airbag tends to cause the outer portion to spread out and become warped outward in the lateral direction, the edge of the flange can come in contact with the vehicle body, and thus serve to restrain the outer portion from becoming warped further.

Moreover, the flange may preferably be in contact with the vehicle body. If the flange is in contact with the vehicle body, the outer portion can be made more unlikely to become warped upon deployment of the airbag.

In the airbag device describe above, the base member may comprise an inner portion located laterally farther inward within the vehicle body relative to the airbag.

The guide plate may comprise a second guide plate provided along a front edge portion of the inner portion.

Provision of the second guide plate may serve to restrain the inner portion from becoming warped upon deployment of the airbag.

The second guide plate described above may preferably be provided along the length from an upper end to a lower end of the inner portion.

The second guide plate may preferably be parallel to the first guide plate. Herein, the term "parallel" herein referred to may include a position displaced slightly from a parallel position due to manufacturing error or the like, or a position slanting at an angle up to 3 degrees.

The side airbag device described above may further comprise an outer covering member configured to cover at least a front side of the base member, and a hook member provided at an end portion of the outer covering member to fasten the outer covering member. Herein, the base member may include an outer covering anchorage portion on which the hook member is hooked, which outer covering anchorage portion is located behind the guide plate as viewed from the storage space.

With this configuration in which the outer covering anchorage portion on which the hook member is hooked is located behind the guide plate as viewed from the storage space, the airbag can be caused to deploy stably without getting hitched on the outer covering anchorage portion when the airbag is caused to deploy.

In the side airbag device described above, the base member may comprise: an outer portion located laterally farther outward within the vehicle body relative to the airbag; and a rear portion located farther rearward relative to the airbag with respect to a front-rear direction of the seat. Herein, preferably, the outer portion includes an outer-side fixing portion to be fixed to the vehicle body, and the rear portion includes a rear-side fixing portion to be fixed to the vehicle body.

The side airbag device may further comprise an outer covering member configured to cover at least a front side of the base member to form a front-facing interior surface. Herein, the outer-side fixing portion may preferably be located closer, than the rear-side fixing portion, to the interior surface.

With this configuration in which the base member is to be fixed to the vehicle body at the outer-side fixing portion provided in the outer portion and at the rear-side fixing portion provided in the rear portion, the side airbag device can be fixed steadily in position. Therefore, even if a force produced upon deployment of the airbag is great, the base member can be kept in position steadily, so that the airbag can be caused to deploy stably.

With the outer-side fixing portion being located closer, than the rear-side fixing portion, to the interior surface, the side airbag device can be fixed steadily in position.

In yet another aspect, a side airbag device in which a base member is restrained from becoming warped out of shape so that an airbag can be caused to deploy stably is proposed. A side airbag device disclosed herein comprises: an airbag; an inflator configured to supply the airbag with gas; a base member configured to accommodate the airbag and the inflator, and fixed to a vehicle body; and an outer covering member configured to cover at least a front side of the base member to form a front-facing interior surface. The base member includes a wire frame made of a metal rod. The wire frame includes: an outer wire frame making up at least part of an outer portion located laterally farther outward within the vehicle body relative to the airbag; an inner wire frame making up at least part of an inner portion located laterally farther inward within the vehicle body relative to the airbag; a rear wire frame located farther rearward relative to the airbag with respect to a front-rear direction of the seat, the rear wire frame connecting the outer wire frame and the inner wire frame; and at least one bridging portion located apart from and farther frontward relative to the rear wire frame, the at least one bridging portion connecting the outer wire frame and the inner wire frame. At least one of the bridging portions includes a laterally outer end portion fixed to a laterally inner side surface of the outer wire frame, and a laterally inner end portion fixed to a laterally outer side surface of the inner wire frame.

With this configuration in which the base member includes a bridging portion connecting the inner wire frame and the outer wire frame, the inner portion and the outer portion are made unlikely to spread out and become warped out of shape laterally outward. This makes it possible to cause the airbag to deploy stably.

Since at least one of the bridging portions includes a laterally outer end portion fixed to a laterally inner side surface of the outer wire frame, and a laterally inner end portion fixed to a laterally outer side surface of the inner wire frame, the outer wire frame and the inner wire frame can be connected firmly at their portions located at short distance.

In the side airbag device described above, the bridging portion may include a first bridging portion connecting an upper portion of the outer portion and an upper portion of the inner portion. Additionally or alternatively, the bridging portion may include a second bridging portion connecting a lower portion of the outer portion and a lower portion of the inner portion.

Connection between the outer wire frame and the inner wire frame at their upper and lower portions by the first bridging portion and the second bridging portion would make the base member more unlikely to become warped out of shape.

The side airbag device described above may preferably be configured such that the inflator includes a cylindrical main body and a bolt provided protrusively from the main body, wherein the bridging portion is located farther, than a center of the main body, away from the interior surface.

With this configuration in which the bridging portion is located farther, than the center of the main body, away from the interior surface, when the airbag is caused to deploy from the interior surface out into the vehicle interior, the airbag can be made unlikely to get hitched on the bridging portion, and thus allowed to deploy stably.

Additionally, the side airbag device may further comprise a mounting bracket which includes an inflator fixing portion to which the inflator is fixed and a base member fixing portion which is located in a position different from a position of the inflator fixing portion and fixed to the base member. Preferably, the inflator fixing portion may have an inflator fixing hole through which the bolt of the inflator is disposed, and the bridging portion may be located farther, than the inflator fixing hole, away from the interior surface.

With this configuration in which the bridging portion is located farther, than the inflator fixing hole, away from the interior surface, when the airbag is caused to deploy from the interior surface out into the vehicle interior, the airbag can be made unlikely to get hitched on the bridging portion, and thus allowed to deploy stably.

Moreover, the bridging portion may preferably be located farther, than every part of the main body, away from the interior surface.

With the bridging portion located farther, than every part of the main body, away from the interior surface, when the airbag is caused to deploy from the interior surface out into the vehicle interior, the airbag can be made unlikely to get hitched on the bridging portion, and thus allowed to deploy stably.

The side airbag device described above may be configured such that the base member includes a wire frame made of a metal rod, wherein the wire frame includes an outer wire frame making up at least part of the outer portion, and an inner wire frame making up at least part of the inner portion, and wherein the bridging portion connects the outer wire frame and the inner wire frame.

With this configuration in which the base member is made with the wire frame, the rigidity of the base member can be increased easily, so that the side airbag device can be made compact in size.

DESCRIPTION OF EMBODIMENTS

Figure 1:
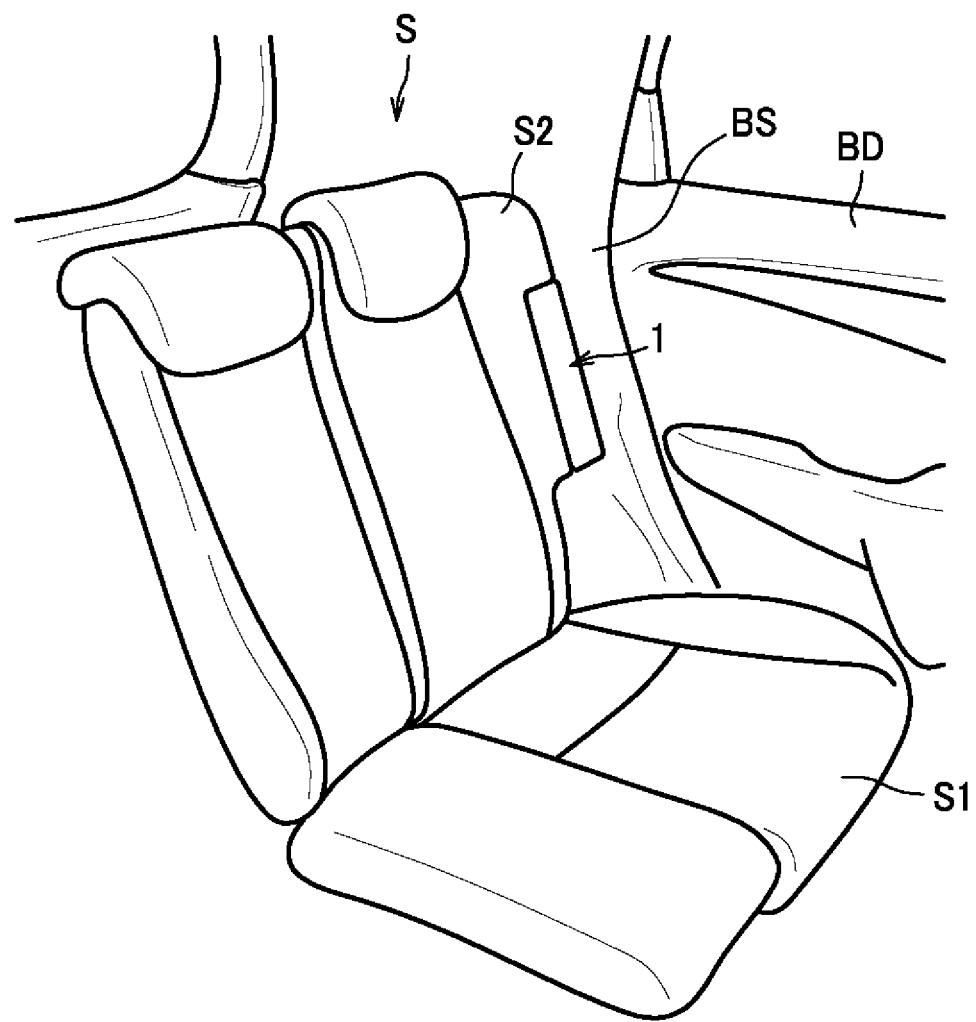
[FIG. 1] is a diagram of a vehicle in which a side airbag device is provided, as viewed from interior of the vehicle.

Hereinafter, a detailed description will be given of an embodiment of the present invention with reference made to accompanying drawings where appropriate. As shown in FIG. 1, a side airbag device 1 is a device applied principally to a rear seat of an automobile, and is disposed between a seat S and a part of a vehicle body (i.e., a sidewall BS and a door BD).

The seat S includes a seat cushion S1 and a seat back S2, and the seat back S2 is rotatable about an axis provided at a lower end thereof so that it is tiltable frontward. The side airbag device 1 is fixed to the sidewall BS, and not fixed to the seat back S2. Therefore, when the seat back S2 is tilted frontward, the side airbag device 1 remains on the sidewall BS and gets exposed, though not illustrated. The side airbag device 1 has a front surface flush substantially with a front surface of the seat back S2, and thus looks as if it is a part of the seat back S2 when the seat S is in normal use position. Although the side airbag device 1 described herein in accordance with this embodiment is one which is installed on the left-hand side within the vehicle body (at the left side of the seat S), it is to be understood that the side airbag device having a reverse configuration as a mirror image of the illustrated configuration may be provided on the right-hand side within the vehicle body. In describing the present embodiment, unless otherwise noted, the terms "laterally inward (inner)" or "laterally outward (outer)" are used to indicate relative positions or directions, not with respect to the side airbag device 1 itself, but with respect to the vehicle body. In other words, "inward (inner)" refers to a position closer to the center in the lateral direction within the vehicle body, and "outward (outer)" refers to a position farther from the center in the lateral direction within the vehicle body. Similarly, the term "front-rear direction" is used to indicate, unless otherwise noted, the front-rear direction as defined with respect to the seat S.

Figure 2:
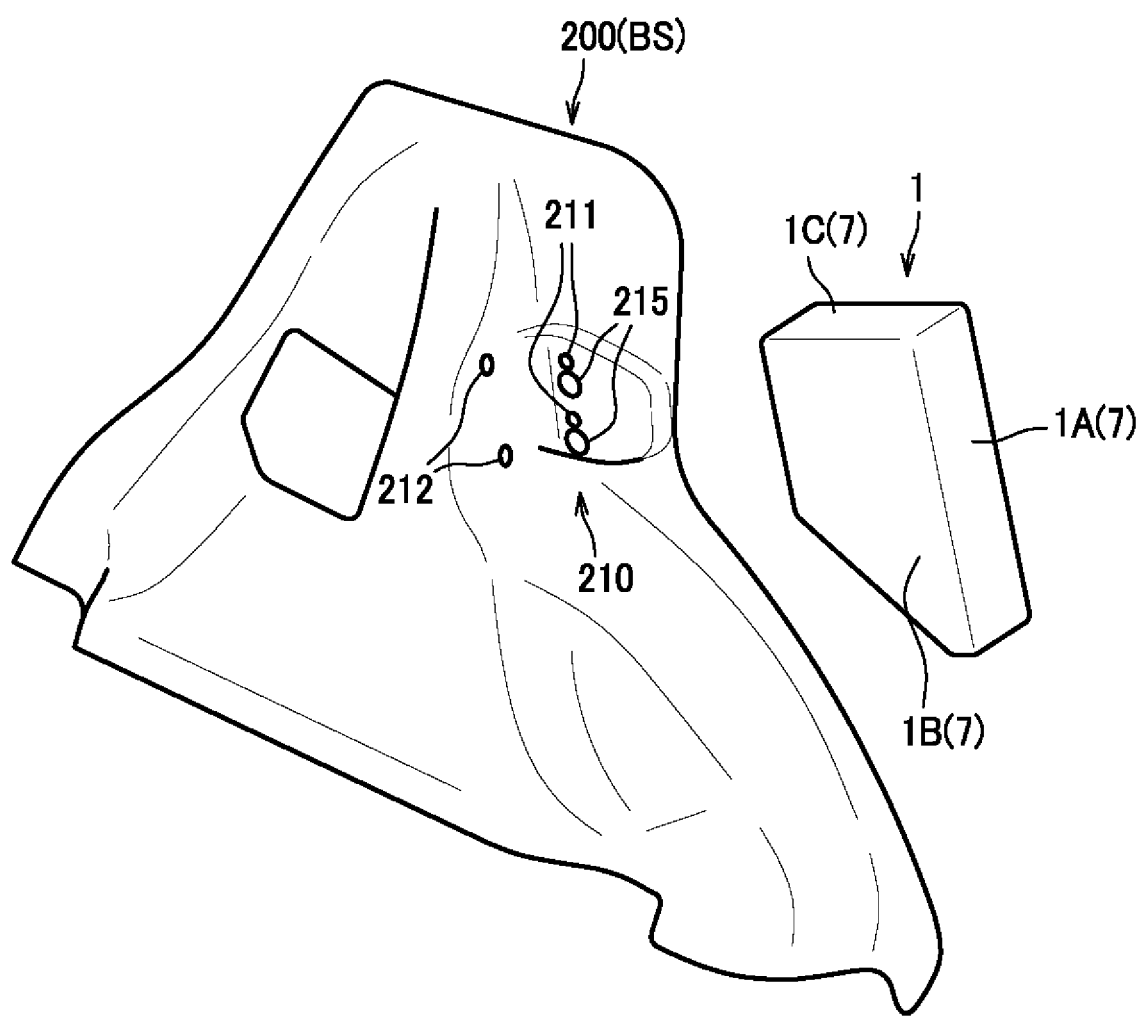
[FIG. 2] is a perspective view of the side airbag device and a side panel of a vehicle body to which the side airbag device is fixed.

As shown in FIG. 2, the sidewall BS includes a side panel 200 inside, and the side airbag device 1 is fixed to the side panel 200.

The side panel 200 includes, as examples of a mount portion 210 for the side airbag device 1 to be mounted thereto, first mount holes 211 provided in a laterally-inward-facing surface and second mount holes 212 provided in a front-facing surface. The first mount holes 211 and the second mount holes 212 are provided in twos; of each two, one is arranged above the other.

The side panel 200 also includes tool access holes 215 provided in the laterally-inward-facing surface to permit a tool for use in mounting the side airbag device 1 to be inserted therethrough. The tool access holes 215 are provided in twos, of which one is arranged above the other.

As described above, the side airbag device 1 is so arranged that when the seat back S2 is tilted frontward, a front side, a laterally inner side and an upper side thereof gets exposed; therefore, these sides are covered with an outer covering member 7. Accordingly, in the side airbag device 1, the outer covering member 7 forms a front-facing interior surface 1A, a laterally-inward-facing inner surface 1B, and a top surface 1C.

Figure 3:
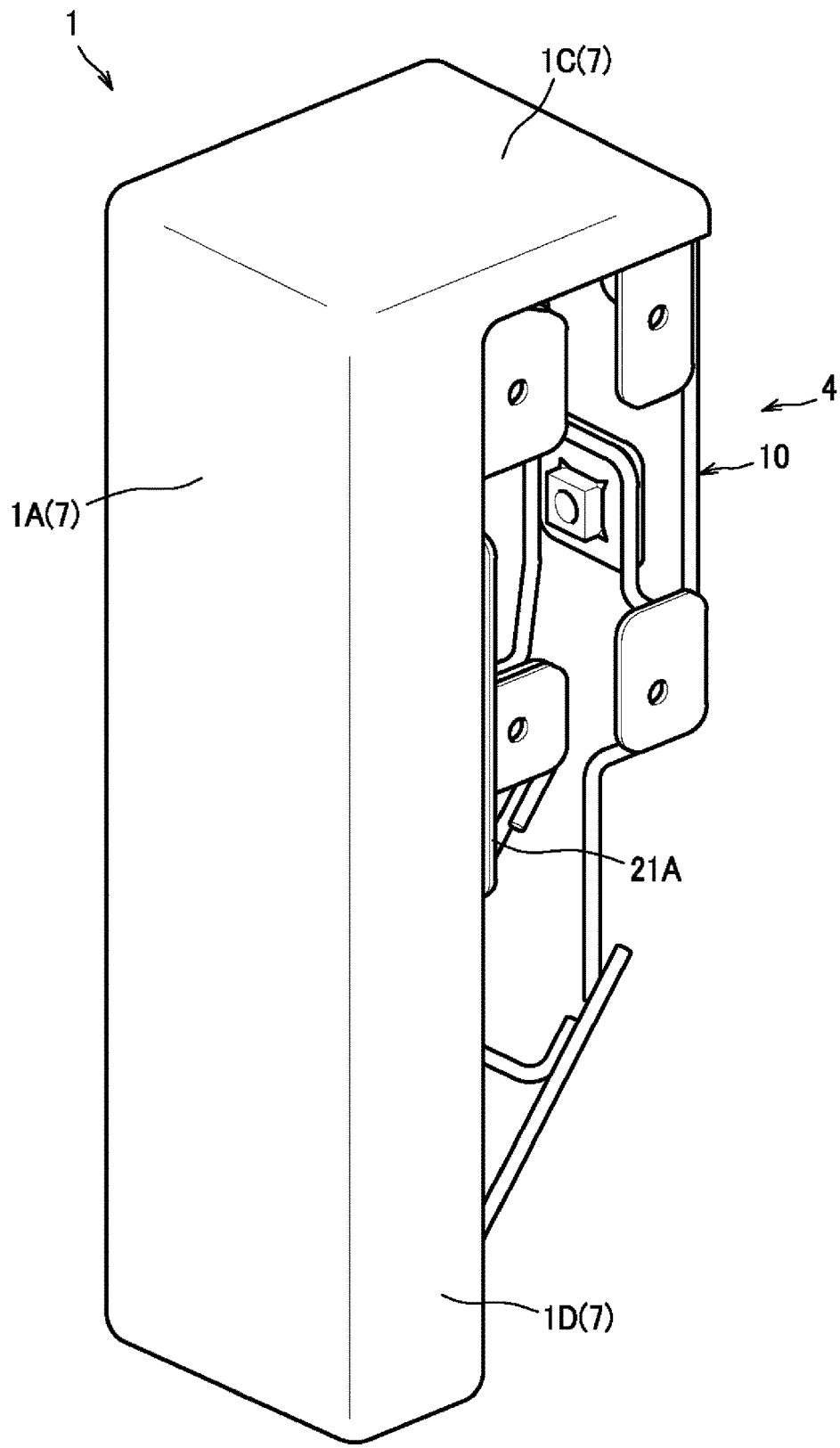
[FIG. 3] is a perspective view of the side airbag device as viewed from the side-panel side.

As shown in FIG. 3, the outer covering member 7 is further configured to have a margin wrapped around the front side extending over a laterally outer side rearward to some extent. Thus, the outer covering member 7 forms an outward-facing surface 1D.

Figure 4:
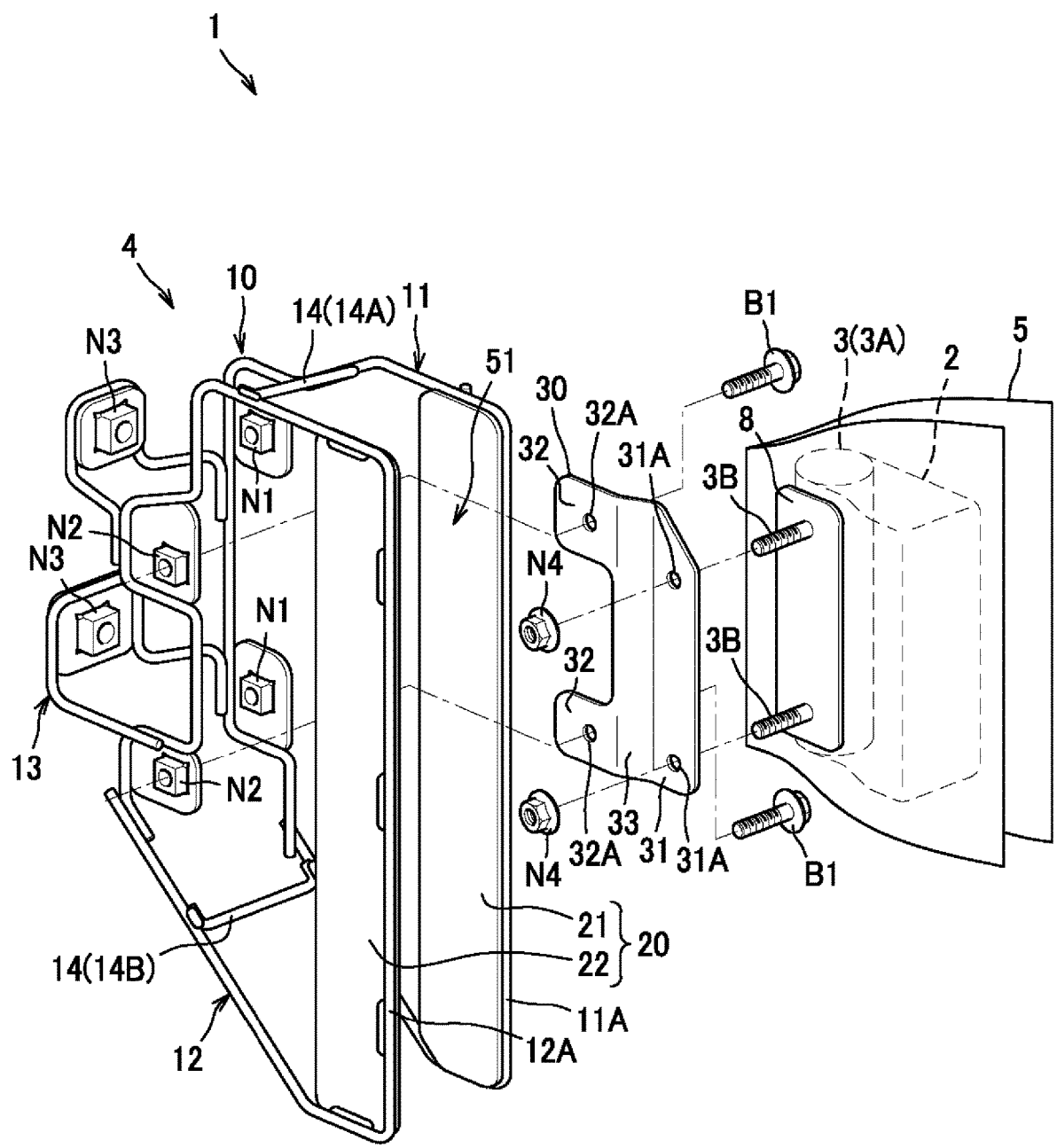
[FIG. 4] is an exploded perspective view of the side airbag device.

As shown in FIG. 4, the side airbag device 1 is configured to comprise an airbag 2, an inflator 3, a base member 4, and a mounting bracket 30.

The airbag 2 is a member inflated with gas supplied inside and caused to deploy in a collision of the vehicle, as known in the art.

The inflator 3 is a member configured to supply the airbag 2 with gas. The inflator 3 includes a cylindrical main body 3A and bolts 3B provided protrusively from the main body 3A. A plurality of (two in this embodiment) bolts 3B are provided herein and arranged along an axis of the main body 3A; each bolt 3B is oriented toward the axis of the main body 3A and fixed to the main body 3A.

The base member 4 is a member configured to accommodate the airbag 2 and the inflator 3, and to be fixed to the vehicle body (to the side panel 200 in this embodiment). Although not illustrated in FIG. 4, the base member 4 is covered with a cushion pad 6 (see FIG. 7), and an outside of the cushion pad 6 is covered with the outer covering member 7. To be more specific, the outer covering member 7 covers at least a front side of the base member 4.

Figure 5:
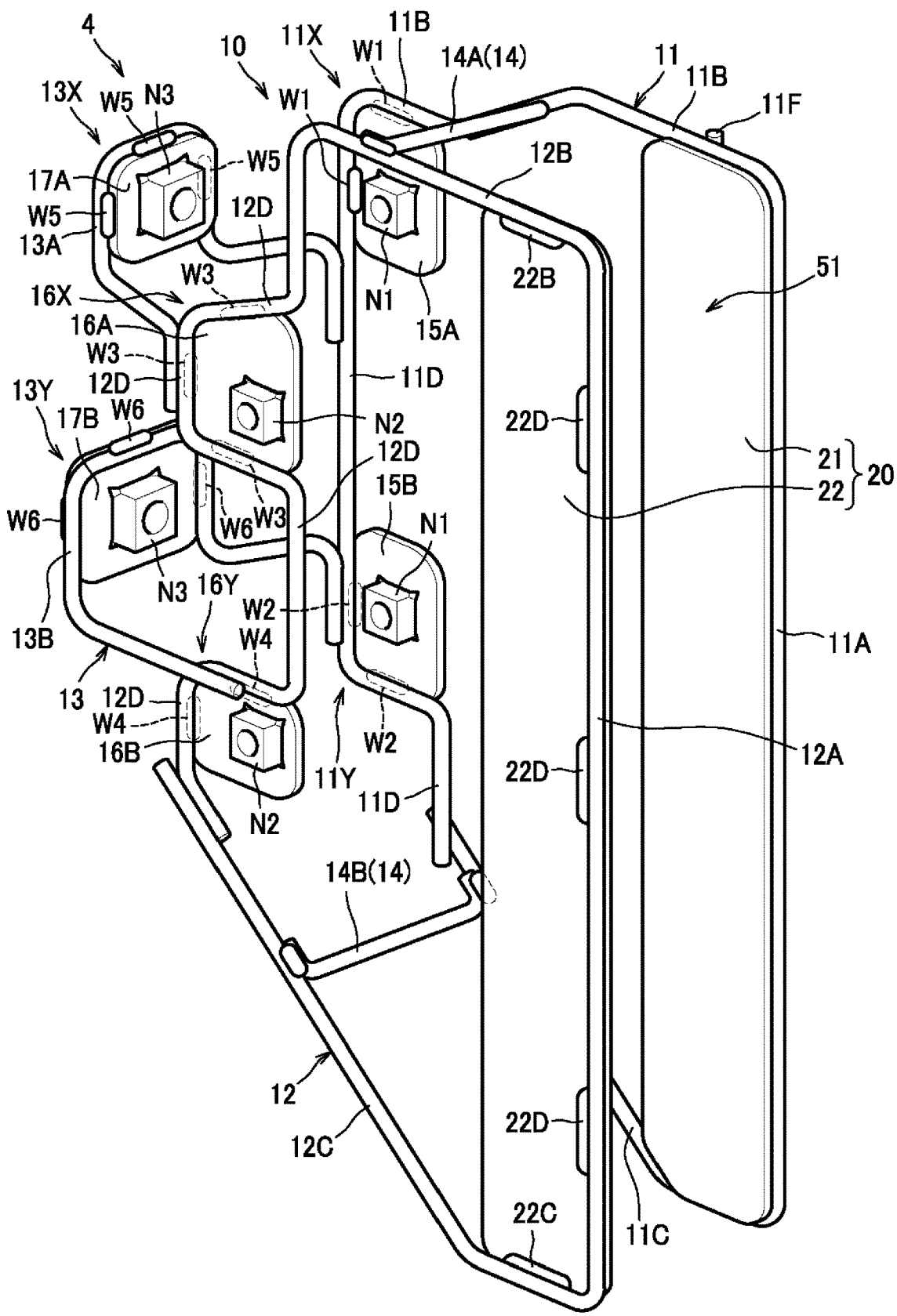
[FIG. 5] is a perspective view of a base member as viewed from a laterally inward direction of the vehicle body.
Figure 6:
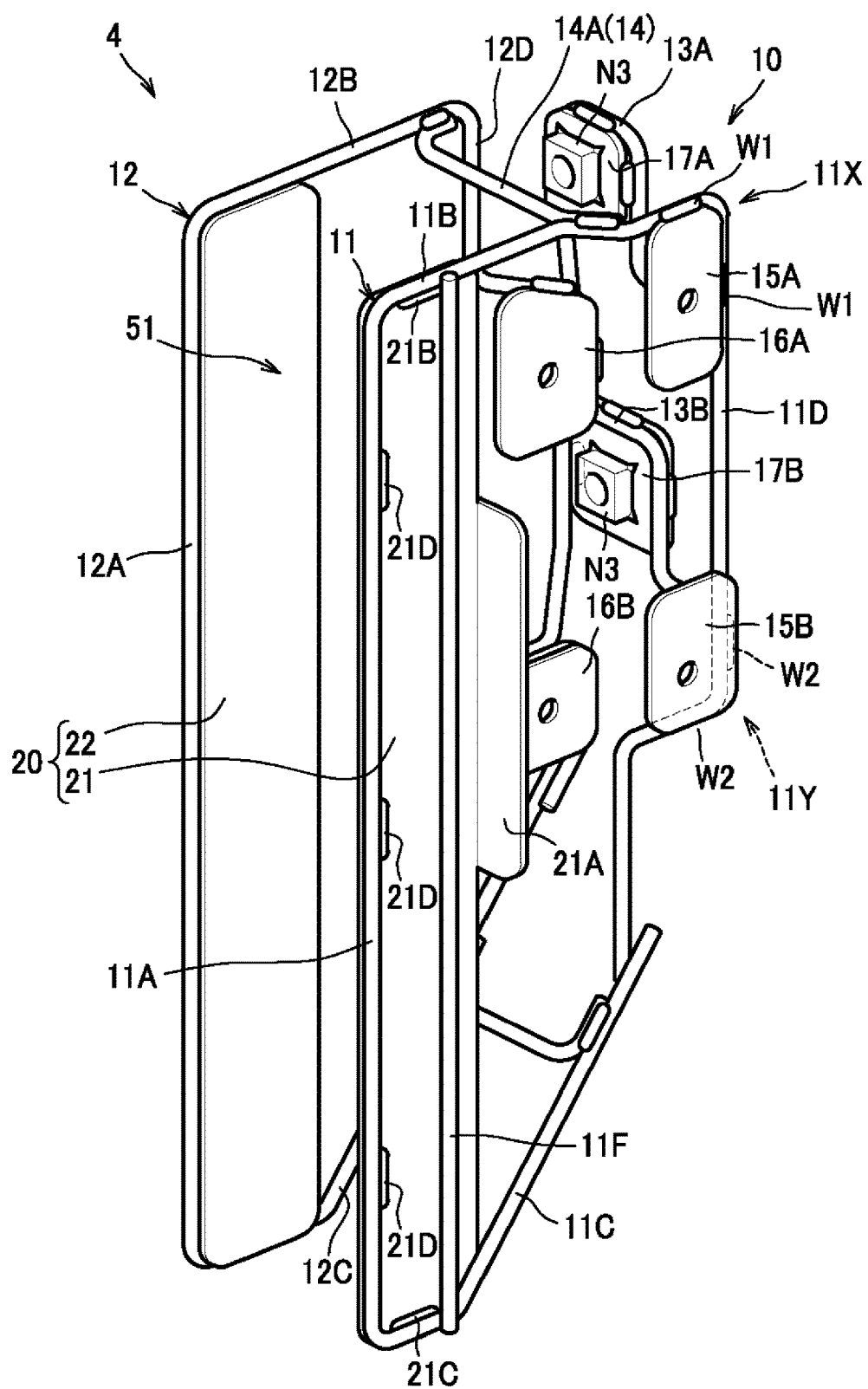
[FIG. 6] is a perspective view of the base member as viewed from a laterally outward direction of the vehicle body.

As shown in FIG. 5 and FIG. 6, the base member 4 includes a wire frame 10 and a guide plate 20.

The wire frame 10 is made of bent metal rods and includes an outer wire frame 11, an inner wire frame 12, a rear wire frame 13, and a bridging portion 14. Inside space surrounded by these elements form a storage space 51 in which the airbag 2 and the inflator 3 are accommodated.

The guide plate 20 is made of metal plates, and includes a first guide plate 21 fixed to the outer wire frame 11 and a second guide plate 22 fixed to the inner wire frame 12.

The outer wire frame 11 includes a front edge portion 11A extending in an upward-downward direction, an upper edge portion 11B extending from an upper end of the front edge portion 11A (at which the outer wire frame 11 is bent) rearward, a lower edge portion 11C extending from a lower end of the front edge portion 11A (at which the outer wire frame 11 is bent) rearward and further extending in an obliquely rearward-and-upward direction, a rear edge portion 11D extending from a rear end of the upper edge portion 11B (at which the outer wire frame 11 is bent) downward and connected to the lower edge portion 11C, and an outer covering anchorage portion 11F extending in the upward-downward direction and connecting the upper edge portion 11B and the lower edge portion 11C. The rear edge portion 11D has a stepped shape with a lower portion thereof shifted to the front with respect to an upper portion thereof. Connection at respective connected portions to make up the wire frame 10 is established by welding.

First fixing plates 15A, 15B made of metal plates and provided to fix the outer wire frame 11 to the side frame 200 are fixed to the outer wire frame 11 by welding.

The first fixing plate 15A is fixed by welding to the upper edge portion 11B and to the rear edge portion 11D. The first fixing plate 15B is located under the first fixing plate 15A, and fixed to the rear edge portion 11D by welding. To elaborate more on the manner of fixing of the first fixing plates 15A, 15B, the first fixing plates 15A, 15B are each formed to have a substantially rectangular shape. The outer wire frame 11 includes an L-shaped portion 11X located along two adjacent sides (to be more specific, an upper side and a rear side) of the first fixing plate 15A, and an L-shaped portion 11Y located along two adjacent sides (to be more specific, a lower side and a rear side) of the first fixing plate 15B. The L-shaped portion 11X is fixed to the first fixing plate 15A with two welds W1 provided at the two sides of the first fixing plate 15A. Similarly, the L-shaped portion 11Y is fixed to the first fixing plate 15B with two welds W2 provided at the two sides of the first fixing plate 15B. With these L-shaped portions 11X, 11Y fixed to the two sides of the first fixing plates 15A, 15B, respectively, the rigidity of the peripheral edges of the first fixing plates 15A, 15B can be enhanced, and the side airbag device 1 can be fixed firmly to the vehicle body.

A nut N1 is fixed by welding to the laterally inner side of each first fixing plate 15A, 15B. Although not designated by reference numerals, the first fixing plates 15A, 15B each have a through hole formed in a position corresponding to the nut N1.

The outer wire frame 11, the first guide plate 21, and the first fixing plates 15A, 15B constitute an outer portion located laterally farther outward within the vehicle body relative to the airbag 2. In other words, the outer wire frame 11 makes up at least part of the outer portion. The outer portion includes the nuts N1 of the first fixing plates 15A, 15B, as an outer-side fixing portion to be fixed to the vehicle body.

The outer covering anchorage portion 11F is a portion on which a hook 7A (see FIG. 7) as a hook member provided at an end portion of the outer covering member 7 to fasten the outer covering member 7 is hooked. It is located behind the first guide plate 21 as viewed from the storage space 51.

The inner wire frame 12 includes a front edge portion 12A extending in the upward-downward direction, an upper edge portion 12B extending from an upper end of the front edge portion 12A (at which the inner wire frame 12 is bent) rearward, a lower edge portion 12C extending from a lower end of the front edge portion 12A (at which the inner wire frame 12 is bent) rearward and further extending in an obliquely rearward-and-upward direction, and a rear edge portion 12D extending from a rear end of the upper edge portion 12B (at which the inner wire frame 12 is bent) downward and connected to the lower edge portion 12C.

Third fixing plates 16A, 16B made of metal plates and provided to fix the mounting bracket 30 thereto are fixed to the inner wire frame 12 by welding. The third fixing plate 16A is fixed to the rear edge portion 12D by welding. The third fixing plate 16B is located under the third fixing plate 16A, and fixed to the rear edge portion 12D by welding. To elaborate more on the manner of fixing of the third fixing plates 16A, 16B, the third fixing plates 16A, 16B are each formed to have a substantially rectangular shape. The inner wire frame 12 includes a U-shaped portion 16X located along three sides (to be more specific, an upper side, a rear side and a lower side) of the third fixing plate 16A, and an L-shaped portion 16Y located along two adjacent sides (to be more specific, an upper side and a rear side) of the third fixing plate 16B. The U-shaped portion 16X is fixed to the third fixing plate 16A with three welds W3 provided at the three sides of the third fixing plate 16A. Similarly, the L-shaped portion 16Y is fixed to the third fixing plate 16B with two welds W4 provided at the two sides of the third fixing plate 16B. With the U-shaped portion 16X fixed to the three sides of the third fixing plate 16A and the L-shaped portions 16Y fixed to the two sides of the third fixing plate 16B, the rigidity of the peripheral edges of the third fixing plates 16A, 16B can be enhanced, and the mounting bracket 30 can be fixed firmly to the base member 4.

A nut N2 is fixed by welding to the laterally inner side of each third fixing plate 16A, 16B. The rear edge portion 12D has a snakelike shape with rearwardly protruding portions to which the third fixing plates 16A, 16B are fixed. Although not designated by reference numerals, the third fixing plates 16A, 16B each have a through hole formed in a position corresponding to the nut N2.

The inner wire frame 12, the second guide plate 22, and the third fixing plates 16A, 16B constitute an inner portion located laterally farther inward within the vehicle body relative to the airbag 2. In other words, the inner wire frame 12 makes up at least part of the inner portion. The base member 4 includes, at a left or right side portion thereof, the nuts N2 as a bracket fixing portion to which the mounting bracket 30 is fixed.

The rear wire frame 13 includes an upper connecting frame 13A and a lower connecting frame 13B.

The upper connecting frame 13A is made of a bent metal rod, and respective end portions thereof are connected to an upper portion of the rear edge portion 11D of the outer wire frame 11 and an upper portion of the rear edge portion 12D of the inner wire frame 12. A second fixing plate 17A made of a metal plate and provided to fix the upper connecting frame 13A to the side panel 200 is fixed to the upper connecting frame 13A by welding.

To elaborate more on the manner of fixing of the second fixing plate 17A, the second fixing plate 17A is formed to have a substantially rectangular shape. The upper connecting frame 13A includes a U-shaped portion 13X located along three sides (to be more specific, an outer side, an upper side and an inner side) of the second fixing plate 17A. The U-shaped portion 13X is fixed to the three sides of the second fixing plate 17A with three welds W5 provided at the three sides of the second fixing plate 17A. With the U-shaped portion 13X fixed to the three sides of the second fixing plate 17A, the rigidity of the peripheral edges of the second fixing plate 17A can be enhanced, and the side airbag device 1 can be fixed firmly to the vehicle body.

A nut N3 as an example of a rear-side fixing portion is fixed by welding to the front side of the second fixing plate 17A.

The lower connecting frame 13B is made of a bent metal rod, and respective end portions thereof are connected to a lower portion of the rear edge portion 11D of the outer wire frame 11 and a lower portion of the rear edge portion 12D of the inner wire frame 12. A second fixing plate 17B made of a metal plate and provided to fix the lower connecting frame 13B to the side panel 200 is fixed to the lower connecting frame 13B by welding. To elaborate more on the manner of fixing of the second fixing plate 17B, the second fixing plate 17B is formed to have a rectangular shape. The lower connecting frame 13B includes a U-shaped portion 13Y located along three sides (to be more specific, an outer side, an upper side and an inner side) of the second fixing plate 17B. The U-shaped portion 13Y is fixed to the three sides of the second fixing plate 17B with three welds W6 provided at the three sides of the second fixing plate 17B. With the U-shaped portion 13Y fixed to the three sides of the second fixing plate 17B, the rigidity of the peripheral edges of the second fixing plate 17B can be enhanced, and the side airbag device 1 can be fixed firmly to the vehicle body.

A nut N3 as an example of a rear-side fixing portion is fixed by welding to the front side of the second fixing plate 17B. Although not designated by reference numerals, the second fixing plates 17A, 17B each have a through hole formed in a position corresponding to the nut N3.

The rear wire frame 13, the second fixing plates 17A, 17B, and the nuts N3 correspond to a rear portion located farther rearward relative to the airbag with respect to a front-rear direction of the seat, and connecting the inner portion and the outer portion.

The nut N1 as an example of an outer-side fixing portion is located closer, than the nut N3 as an example of a rear-side fixing portion, to the interior surface 1A.

The bridging portion 14 is made of a metal rod, and includes a first bridging portion 14A and a second bridging portion 14B.

The first bridging portion 14A connects the upper edge portion 11B provided in an upper portion of the outer wire frame 11 and the upper edge portion 12B provided in an upper portion of the inner wire frame 12.

Figure 9:
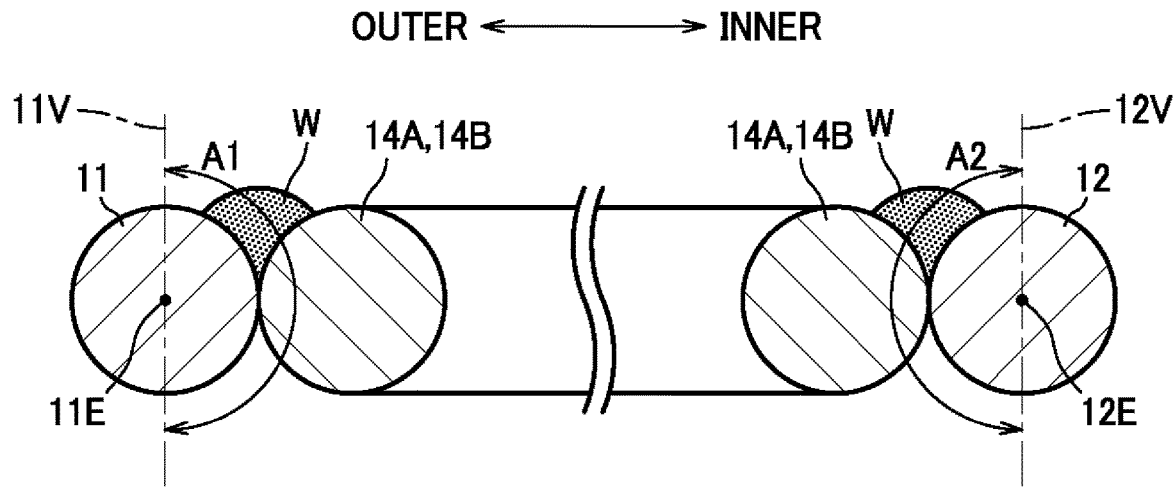
[FIG. 9] includes (a) a diagram for explaining a mode of fixing an outer wire frame and an inner wire frame to a bridging portion; (b) a diagram showing a desirable area to be joined of the outer wire frame; and (c) a diagram showing a desirable area to be joined of the inner wire frame.
Figure 9:
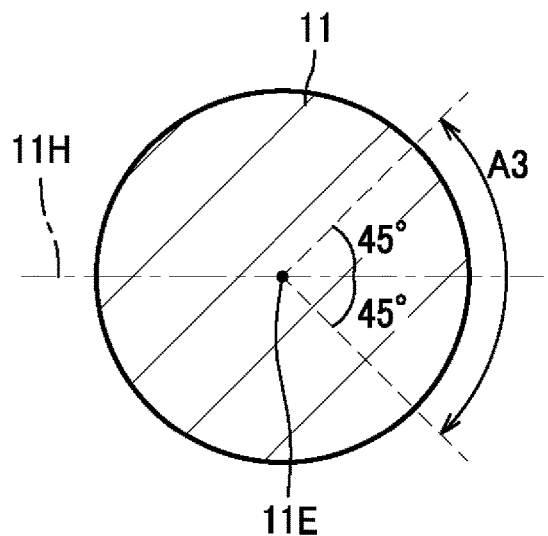
Figure 9:
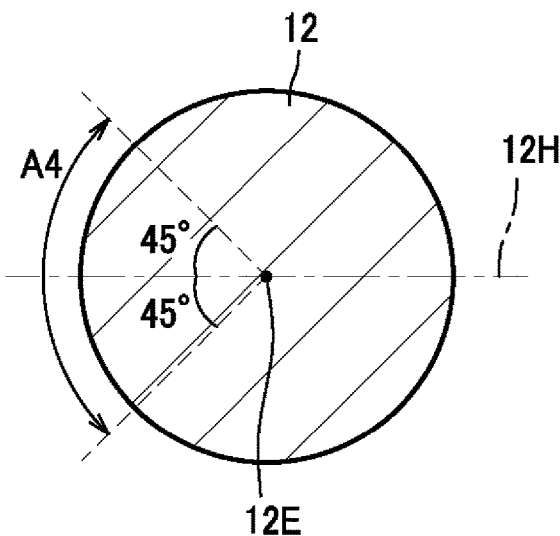

To be more specific, as shown in FIG. 9 (*a*), a laterally outer end portion of the first bridging portion 14A is fixed to a laterally inner side surface of the outer wire frame 11 with a weld W provided thereat, and a laterally inner end portion of the first bridging portion 14A is fixed to a laterally outer side surface of the inner wire frame 12. In the present embodiment, as one example, the laterally innermost portion of the outer wire frame 11 and the laterally outermost portion of the first bridging portion 14A are arranged in contact with or in close proximity to each other so that the outer wire frame 11 and the first bridging portion 14A are fixed together. Similarly, the laterally outer most portion of the inner wire frame 12 and the laterally innermost portion of the first bridging portion 14A are arranged in contact with or in close proximity to each other so that the inner wire frame 12 and the first bridging portion 14A are fixed together.

The second bridging portion 14B connects the lower edge portion 11C provided in a lower portion of the outer wire frame 11 and the lower edge portion 12C provided in a lower portion of the inner wire frame 12.

To be more specific, a laterally outer end portion of the second bridging portion 14B is fixed to a laterally inner side surface of the outer wire frame 11 with a weld W provided thereat, and a laterally inner end portion of the second bridging portion 14B is fixed to a laterally outer side surface of the inner wire frame 12 with a weld W provided thereat. In the present embodiment, as one example, the laterally innermost portion of the outer wire frame 11 and the laterally outermost portion of the second bridging portion 14B are arranged in contact with or in close proximity to each other so that the outer wire frame 11 and the second bridging portion 14B are fixed together. Similarly, the laterally outermost portion of the inner wire frame 12 and the laterally innermost portion of the second bridging portion 14B are arranged in contact with or in close proximity to each other so that the inner wire frame 12 and the second bridging portion 14B are fixed together.

Herein, the laterally inner side surface of the outer wire frame 11 refers to a surface located on a laterally inner side of a vertical surface 11V containing a center 11E of the outer wire frame 11, i.e., a surface region shown as a range A1. Similarly, the laterally outer side surface of the inner wire frame 12 refers to a surface located on a laterally outer side of a vertical surface 12V containing a center 12E of the inner wire frame 12, i.e., a surface region shown as a range A2. Limitation within these ranges in which the outer wire frame 11 and the laterally outer end portion of the bridging portion 14 are fixed together and the inner wire frame 12 and the laterally inner end portion of the bridging portion 14 are fixed together makes it possible to firmly connect the outer wire frame 11 and the inner wire frame 12 by the bridging portion 14 at their portions located at short distance.

In order to more firmly fix the outer wire frame 11 and the inner wire frame 12 by the bridging portion 14, preferably, a limited region of a laterally inner surface of the outer wire frame 11 as shown in FIG. 9 (*b*), i.e., a surface region ranging within 45 degrees upward and downward with respect to a horizontal plane 11H containing the center 11E (see range A3 shown in the drawing) of the outer wire frame 11 and the laterally outer end portion of the bridging portion 14 are fixed together, and a limited region of a laterally outer surface of the inner wire frame 12 as shown in FIG. 9 (*c*), i.e., a surface region ranging within 45 degrees upward and downward with respect to a horizontal line 12H containing the center 12H (see range A4 shown in the drawing) of the inner wire frame 12 and the laterally inner end portion of the bridging portion 14 are fixed together.

The first bridging portion 14A and the second bridging portion 14B are located apart from and farther frontward relative to the rear portion.

The first guide plate 21 is so provided as to extend in the upward-downward direction along the front edge portion 11A of the outer wire frame 11 (outer portion), and fixed to the front edge portion 11A, the upper edge portion 11B and the lower edge portion 11C by welding. The first guide plate 21 is located on a storage-space 51 side of the front edge portion 11A, the upper edge portion 11B and the lower edge portion 11C.

The first guide plate 21 is so provided as to span a range from the upper edge portion 11B to the lower edge portion 11C, i.e., from the upper end to the lower end of the outer portion. The first guide plate 21 has its upper end portion fixed by welding to the upper edge portion 11B with a weld 21B provided thereat, and its lower end portion fixed by welding to the lower edge portion 11C with a weld 21C provided thereat. The first guide plate 21 has its front end portion fixed by welding to the front edge portion 11A of the outer wire frame 11 with three welds 21D provided thereat. The three welds 21D are arranged in the upward-downward direction. Thus, the front edge portion of the first guide plate 21 is fixed along the front edge portion 11A of the outer wire frame 11.

Figure 7:
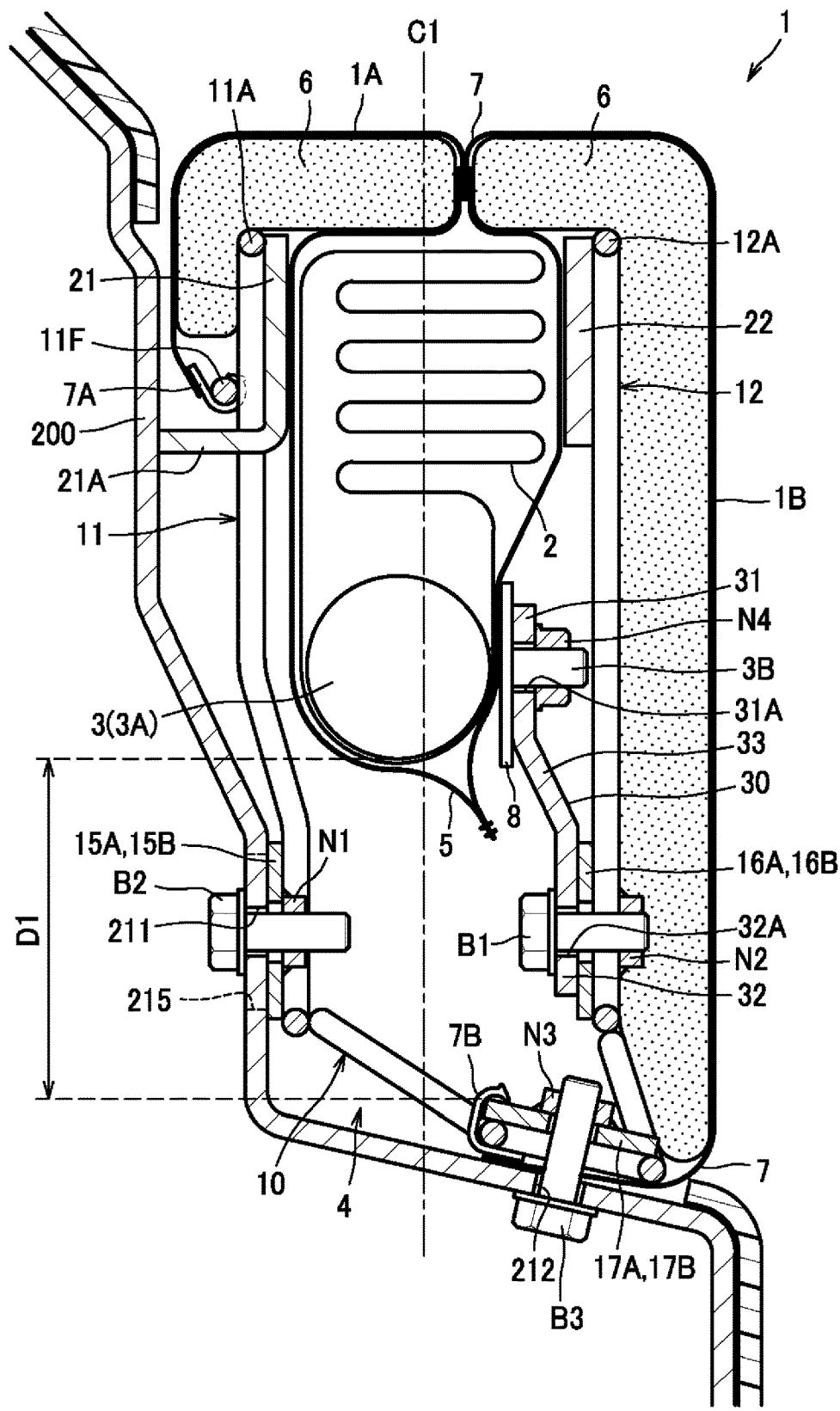
[FIG. 7] is a horizontal section of the side airbag device.

Furthermore, the first guide plate 21 includes, in its rear end portion, a flange 21A extending outward in the lateral direction as defined with respect to the vehicle body. The flange 21A is a portion configured to contact the side panel 200 to thereby restrain the outer portion when pressed laterally outward by a force acted thereon upon deployment of the airbag 2 from becoming warped out of shape. In this embodiment, as shown in FIG. 7, it is already in contact with the side panel 200 before deployment of the airbag 2.

The second guide plate 22 is so provided as to extend in the upward-downward direction along the front edge portion 12A of the inner wire frame 12 (inner portion), and fixed to the front edge portion 12A, the upper edge portion 12B and the lower edge portion 12C by welding. The second guide plate 22 is located on a storage-space 51 side of the front edge portion 12A, the upper edge portion 12B and the lower edge portion 12C.

The second guide plate 22 is so provided as to span a range from the upper edge portion 12B to the lower edge portion 12C, i.e., from the upper end to the lower end of the inner portion. The second guide plate 22 has its upper end portion fixed by welding to the upper edge portion 12B with a weld 22B provided thereat, and its lower end portion fixed by welding to the lower edge portion 12C with a weld 22C provided thereat. The second guide plate 22 has its front edge portion fixed by welding to the front edge portion 12A of the inner wire frame 12 with three welds 22D provided thereat. The three welds 22D are arranged in the upward-downward direction. Thus, the front edge portion of the second guide plate 22 is fixed along the front edge portion 12A of the inner wire frame 12.

The second guide plate 22 is located parallel to the first guide plate 21. This makes the first guide plate 21 and three second guide plate 22 capable of receiving, respectively, substantially uniformly distributed portions of force acted thereon upon deployment of the airbag 2, so that the rigidity of the base member 4 can be enhanced effectively.

The mounting bracket 30 is a member for mounting the inflator 3 to the base member 4, and is made of a metal plate. As shown in FIG. 4, the mounting bracket 30 includes an inflator fixing portion 31 to which the inflator 3 is fixed, a base member fixing portion 32 which is located in a position different from a position of the inflator fixing portion 31 and fixed to the base member 4, and a connecting portion 33 connecting the inflator fixing portion 31 and the base member fixing portion 32. The base member fixing portion 32 is so provided as to extend from the upper and lower portions of the connecting portion 33 rearward.

As shown in FIG. 7, the inflator fixing portion 31 and the base member fixing portion 32 each have a shape of a flat plate extending in the front-rear direction. The inflator fixing portion 31 is located closer, than the base member fixing portion 32, to a center C1 of the base member 4 in the lateral direction. It is to be understood that the center C1 of the base member 4 in the lateral direction is defined as a plane equidistant from the front edge portions 11A, 12A of the base member 4 in the lateral direction.

The connecting portion 33 has a shape of a flat plate obliquely extending between and connecting a rear end of the inflator fixing portion 31 and respective front ends of the base member fixing portion 32.

The inflator fixing portion 31 is located closer to the interior surface 1A, i.e., farther frontward, than the base member fixing portion 32. The base member fixing portion 32 is located farther than the inflator 3 away from the interior surface 1A.

Referring back to FIG. 4, the inflator 3 includes a plurality of (two, in this embodiment) bolts 3B, and the inflator fixing portion 31 has two inflator fixing holes 31A through which the two bolts 3B are disposed, respectively.

The base member fixing portion 32 has two (a plurality of) base member fixing holes 32A through which a plurality of fastening members (two bolts B1, in this embodiment) are disposed, respectively.

The inflator 3 is fixed by the mounting bracket 30 to the base member 4.

To be more specific, as shown in FIG. 7, the inflator 3 is disposed inside the airbag 2, and the airbag 2 is surrounded with a webbing 5 by which a direction of deployment of the airbag 2 is restricted (see also FIG. 5). The webbing 5 has front end portions each of which is joined to the outer covering member 7, and serves to assist in cleaving open the cushion pad 6 upon deployment of the airbag 2.

The bolts 3B of the inflator 3 are each disposed through the airbag 2 and the webbing 5, as well as a plastic reinforcement plate 8, and the inflator fixing holes 31A. Then, the nuts N4 are screwed on the bolts 3B, whereby the mounting bracket 30 is fixed to the inflator 3. As a result, the bolts 3B protruding from the main body 3A are oriented laterally inward within the vehicle body.

The base member fixing portion 32 of the mounting bracket 30 is fixed to the third fixing plate 16A with the bolts B1 inserted through the base member fixing holes 32A and screwed in the nuts N2. In this way, the mounting bracket 30 is fixed to the inner portion of the base member 4. The inflator 3 is fixed together with the airbag 2 to the inner portion.

The aforementioned tool access holes 215 are located in positions aligned with the bolts B1 and the nuts N2 in the lateral direction, so that a tool such as a hexagonal socket wrench can be inserted from the outer side of the side panel 200 through each tool access hole 215 to tighten the corresponding bolt B1.

Herein, location of the inflator fixing portion 31 closer, than the base member fixing portion 32, to the center of the base member 4 in the lateral direction makes it easy to have space left between the inflator fixing portion 31 and the cushion pad 6. Accordingly, the nuts for fixing the bolts 3B of the inflator 3 can be easily located on the right side of the inflator fixing portion 31 (one side of the inflator fixing portion 31 opposite to the other side on which the center C1 of the base member 4 in the lateral direction is located). Particularly, in an embodiment where the cushion pad 6 is formed integrally with the base member 4, the cushion pad 6 may be likely to enter and occupy the space farther toward the center of the base member 4; notwithstanding, space can be left for location of the nuts N4 with increased ease.

The outer covering member 7 has a laterally outer end portion at which a hook 7A is fixed. The hook 7A is hooked on an outer covering anchorage portion 11F. The outer covering member 7 has a laterally inner end portion at which a hook 7B is fixed. The outer covering member 7 lying on the laterally inside covers the cushion pad 6 along its right side surface to its rear end, then wraps around up to its rear side; the laterally inner end portion is hooked on the second fixing plates 17A, 17B.

The bolts B2 inserted from the outer side of the side panel 200 through the first mount holes 211 are fastened to the nuts N1 of the base member 4. In this way, the nuts N1 as an example of an outer-side fixing portion of the outer portion are fixed to the side panel 200.

The bolts B3 inserted from the outer side of the side panel 200 through the second mount holes 212 are fastened to the nuts N3. In this way, the nuts N3 as an example of a rear-side fixing portion of the rear portion are fixed to the side panel 200.

Accordingly, the base member 4 is fixed to the side panel 200 with the bolts B1 as an example of fastening members with their shanks oriented in a leftward or rightward direction and the bolts B3 as an example of fastening members oriented in a frontward or rearward direction. In other words, the outer-side fixing portion and the rear-side fixing portion of the base member 4 are fixed with a plurality of fastening members with their shanks oriented in different directions; therefore, the side airbag device 1 is fixed to the vehicle body and steadily kept in position.

A front surface of the rear portion, for example, the front surface of the second fixing plate 17A, includes a portion located 3 cm or farther apart in a direction perpendicular to the interior surface 1A from the inflator 3. For example, a distance D1 between the position of the rearmost portion of the inflator 3 and the position of the frontmost portion of the second fixing plate 17A is set herein to be 3$cm$ or more. In this way, a space is provided between the front surface of the rear portion and the inflator 3 so that the airbag can enter the space when the airbag is caused to deploy.

Figure 8:
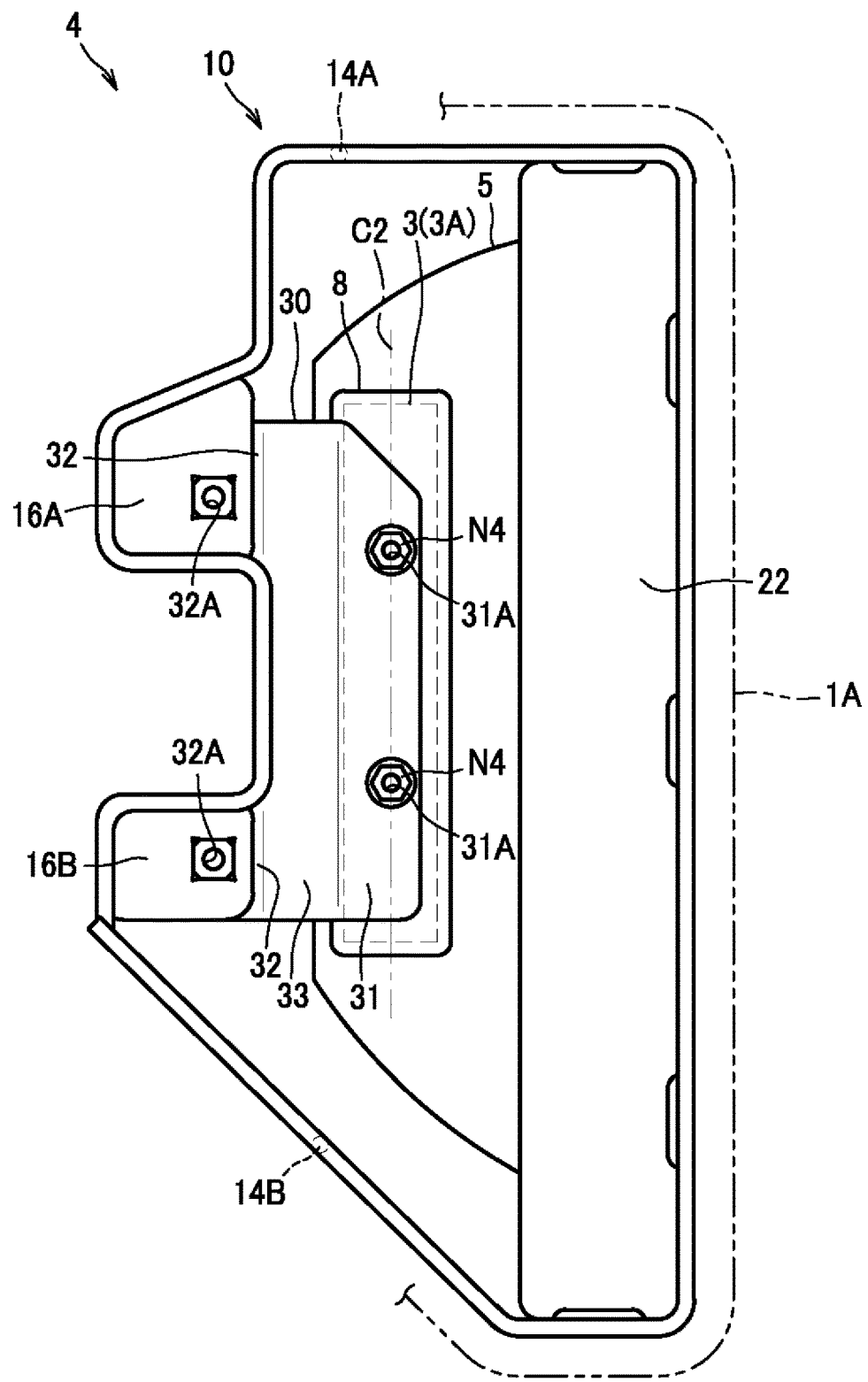
[FIG. 8] is a diagram of the side airbag device as viewed from the laterally inward direction.

As shown in FIG. 8, the first bridging portion 14A and the second bridging portion 14B are located farther (i.e., farther rearward), than a center C2 of the main body 3A of the inflator 3, away from the interior surface 1A. The first bridging portion 14A and the second bridging portion 14B are located farther, than the inflator fixing holes 31A, away from the interior surface 1A. Furthermore, the second bridging portion 14B is located farther (i.e., farther rearward), than every part of the main body 3A, away from the interior surface 1A. It is thus to be understood that the bridging portion 14 is so located that at least one of its subset is farther, than every part of the main body 3A, away from the interior surface 1A. It would be considered to be preferable that the first bridging portion 14A is also located farther, than every part of the main body 3A, away from the interior surface 1A.

Hereinafter, a brief description will be given of a manufacturing method adopted when the side airbag device 1 is manufactured.

To make the side airbag device 1, first, a base member 4 is fabricated by welding, and a cushion pad 6 is formed integrally with the base member 4 inserted in a mold. Then, an inflator 3 is fixed to a mounting bracket 30, and put inside the base member 4. The cushion pad 6 is covered by an outer covering member 7, a hook 7A is hooked on an outer covering anchorage portion 11F, and a hook 7B is hooked on second fixing plates 17A, 17B.

Next, the base member 4 is fixed to the side panel 200 with bolts B2, B3. Then, the inflator 3 to which the mounting bracket 30 is fixed is fixed to the base member 4. To be more specific, the bolts B1 is applied through the mounting bracket 30 and engaged in the nuts N2, whereby the mounting bracket 30 is fixed to the base member 4. Tightening of the bolts B1 is performed using a tool which may be inserted through the tool access hole 215 as described above.

With this manufacturing method, even after the base member 4 is surrounded with the cushion pad 6 as a result of forming the cushion pad 6 integrally with the base member 4, the inflator 3 can be fixed to the base member 4 easily by fixing, to the base member 4, the inflator 3 with a mounting bracket 30 fixed thereto.

Operation and advantageous effects of the side airbag device 1 configured as described above in accordance with the present embodiment will be described below.

When the inflator 3 issues gases in a broadside collision of the vehicle, the airbag 2 gets filled with the gases and inflates and causes the front side of the cushion pad 6 and the outer covering member 7 to cleave open, to thereby cause the airbag 2 to deploy through the interior surface 1A into the vehicle interior. In this process, the airbag 2 is constrained within the space sandwiched between the inflator 3 and the inflator fixing portion 31 of the mounting bracket 30. Under the circumstances, the airbag 2 is likely to unfold in a laterally outward direction, i.e., on a side opposite to a side on which the inner portion (inflator fixing portion 31) is disposed, within the vehicle body. Accordingly, the airbag 2 is likely to be caused to deploy along the sidewall BS of the vehicle body and the door BD toward a side space of an occupant.

Depending on the conditions upon deployment of the airbag 2, e.g., that the cushion pad 6 is resistant to cleaving, or the pressure of gases produced by the inflator 3 is high, or otherwise, there is a possibility that the internal pressure of the airbag 2 will become higher than expected. It is nevertheless to be noted that the side airbag device 1 according to the present embodiment with the inflator 3 fixed to the inner portion may be designed to have increased space at the rear side of the inflator 3. Particularly, in this embodiment, the front surface of the rear portion has a part spaced 3*cm* or more apart from the inflator 3, and thus allows the airbag 2 to unfold into the space at the rear side of the inflator 3 when a force produced upon deployment of the airbag 2 is great, with the result that the airbag 2 can be restrained from rapidly and violently inflating frontward for deployment.

Moreover, in the present embodiment, the guide plate 20 is located on the storage-space 51 side of the wire frame 10, e.g., the outer wire frame 11 or the inner wire frame 12, and the airbag 2 can thus be made unlikely to get hitched on the wire frame 10 upon deployment of the airbag 2. Accordingly, the airbag 2 can be caused to deploy stably. Moreover, the guide plate 20 may serve to reinforce the front edge portions 11A, 12A of the wire frame 10, so that the rigidity of the base member 4 can be enhanced. Particularly, in the present embodiment, fixing of the guide plate 20 to the front edge portions 11A, 12A of the wire frame 10 results in mutual reinforcement of the front edge portion of the guide plate 20 and the front edge portion of the wire frame 10, and thus serves to enhance the rigidity of the front edge portion of the base member 4. Therefore, the outer portion and the inner portion, particularly, the front edge portions 11A, 12A, can be restrained from becoming warped out of shape upon deployment of the airbag 2, so that the airbag 2 can be caused to stably deploy frontward.

Since the bridging portion 14 is located farther, than the center C2 of the main body 3A of the inflator 3, away from the interior surface 1A, the airbag 2 is unlikely to get hitched on the bridging portion 14 when the airbag 2 is caused to deploy through the interior surface 1A out into the vehicle interior. Since the bridging portion 14 is located farther, than the inflator fixing hole 31A, away from the interior surface 1A, the airbag 2 is unlikely to get hitched on the bridging portion 14 upon deployment of the airbag 12. Furthermore, since the second bridging portion 14B is located farther, than every part of the main body 3A of the inflator 3, away from the interior surface 1A, the airbag 2 is unlikely to get hitched on the bridging portion 14 when the airbag 2 is caused to deploy through the interior surface 1A out into the vehicle interior. Consequently, the airbag 2 can be caused to deploy stably.

Since the bridging portion 14 connects the inner portion and the outer portion, the inner portion and the outer portion are made unlikely to spread out and become warped out of shape laterally outward. Accordingly, the airbag 2 can be caused to deploy stably. Particularly, in this embodiment, the first bridging portion 14A and the second bridging portion 14B are provided to connect the upper and lower end portions respectively of the outer portion and the inner portion; therefore, the base member 4 can be made more unlikely to become warped out of shape.

Since the base member 4, in this embodiment, is fixed to the side panel 200 at the nuts N1 as an example of the outer-side fixing portion located in the outer portion and at the nuts N3 as an example of the rear-side fixing portion located in the rear portion, the side airbag device 1 can be fixed steadily in position. Accordingly, even if a force acted thereon by deployment of the airbag 2 is great, the base member 4 can be kept in position steadily, so that the airbag 2 can be caused to deploy stably.

In particular, because the nuts N1 as an example of the outer-side fixing portion are located closer, than the nuts N3 as an example of the rear-side fixing portion, to the interior surface 1A, the side airbag device 1 can be fixed steadily in position, and the airbag 2 can be caused to deploy stably.

Moreover, since the mounting bracket 32 in this embodiment is so positioned that the inflator fixing portion 31 is located closer, than the base member fixing portion 32, to the interior surface 1A, the airbag 2 is unlikely to get hitched on the base member fixing portion 32 upon deployment of the airbag 2, so that the airbag 2 can be caused to deploy stably. Moreover, the airbag 2 is also unlikely to get hitched on the nuts N1 as an example of the outer-side fixing portion, whereby the deployment of the airbag 2 can be made more stable. Furthermore, since the inflator 3 is located near the interior surface 1A, a space can be provided easily at the rear side of the inflator 3, with the result that the airbag 2 can be restrained from rapidly and violently inflating frontward for deployment.

Since the outer covering anchorage portion 11F on which the hook 7A of the outer covering member 7 is hooked is located behind the first guide plate 21 as viewed from the storage space 51, the airbag 2 can be allowed to deploy stably without getting hitched on the outer covering anchorage portion 11F when the airbag 2 is caused to deploy.

Since the first guide plate 21 includes the flange 21A extending outward in the lateral direction, the edge of the flange 21A can come in contact with the side panel 200 when deployment of the airbag 2 causes the outer portion to spread out and become warped outward in the lateral direction, so that the outer portion can be restrained from becoming further warped out of shape. Since the flange 21A particularly in this embodiment is in contact with the side panel 200 at normal times, the outer portion can be made more unlikely to become warped out of shape upon deployment of the airbag 2, so that the airbag 2 can be caused to deploy stably.

In the present embodiment, the inflator 3 is fixed to the base member 4 by the bracket 30. Accordingly, the inflator 3 can be fixed to the mounting bracket 30 to form a subassembly, and the base member fixing portion 32 may be used to fix the mounting bracket 30 to the base member 4, with the result that the inflator 3 can be mounted to the base member 4 with ease. In particular, since the base member fixing portion 32 is in a position shifted rearward relative to a position of the inflator 3, the base member fixing portion 32 is easy to access sideways, so that the mounting bracket 30 can be fixed to the base member 4 by making use of the base member fixing portion 32 with ease. The side airbag device 1 according to the present embodiment thus achieves increased ease in assembly.

Moreover, since the inflator 3 in the present embodiment is fixed with a plurality of bolts 3B, the inflator 3 can be fixed steadily in position. In addition, the mounting bracket 30 can be fixed to the base member 4 steadily in position with a plurality of bolts B1.

Furthermore, according to the present embodiment, in which the base member 4 is made with the wire frame 10, the rigidity of the base member 4 can be increased easily. Therefore, the side airbag device 1 can be made compact in size, so that the side airbag device 1 can be installed in a compact-type passenger car.

Although one exemplary embodiment of the present invention has been described above, the present invention is not limited to the above-described embodiment. Specific configurations may be modified where appropriate without departing from the gist of the present invention.

For example, in the above-described embodiment, the side airbag device 1 is fixed directly to the side panel 200; alternatively, a bracket may be fixed to the side panel 200, and the side airbag device 1 may be fixed to this bracket.

In the above-described embodiment, the nuts N1, N2, N3 are welded to the first fixing plates 15A, 15B, the third fixing plates 16A, 16B, and the second fixing plates 17A, 17B, respectively, but the nuts may not be welded; alternatively, bolts and nuts may be used for fastening, or nuts may be welded to the vehicle body and bolts may be engaged in the nuts. By extension, rivets or any other fastening members may be used instead. In these alternative configurations, the first fixing plates 15A, 15B correspond to the outer-side fixing portion, the third fixing plates 16A, 16B correspond to the bracket fixing portion, and the second fixing plates 17A, 17B correspond to the rear-side fixing portion.

In the above-described embodiment, the hook 7A is hooked on the outer covering anchorage portion 11F provided in the wire frame 10, and the hook 7B is hooked on the second fixing plates 17A, 17B, but the anchorage for each hook 7A, 7B to be hooked on may not be limited thereto; any suitable place may be adopted in conformity with the structural features of the base member.

In describing the embodiment above, a side airbag device used in a rear seat of an automobile has been taken as an example, but may alternatively be used in a front seat.

In describing the embodiment above, a base member made of a wire frame has been taken as an example, but the base member may alternatively be made of material other than the wire frame, such as plastic, a metal plate, etc.

In describing the embodiment above, a configuration in which an outer portion and an inner portion of the base member are fixed to the vehicle body has been taken as an example, but the mounting structure for the base member may not be limited thereto; alternatively, the base member may be fixed to the vehicle body only at its outer portion, or only at its rear portion, instead.

Any of the elements explained in relation to the exemplified embodiments and illustrative modified examples disclosed in this description may be implemented in combination as desired.

The invention claimed is:

1. A side airbag device disposed between a vehicle body and a seat, the side airbag device comprising:
   an airbag;
   an inflator configured to supply the airbag with gas;
   a base member configured to accommodate the airbag and the inflator, and to be fixed to the vehicle body;
   an outer covering member configured to cover at least a front side of the base member to form a front-facing interior surface; and
   a mounting bracket which includes an inflator fixing portion to which the inflator is fixed and a base member fixing portion which is located in a position different from a position of the inflator fixing portion and fixed to the base member,
   wherein the base member comprises:
      a left side portion facing a left side of the inflator,
      a right side portion facing a right side of the inflator,
      a bracket fixing portion that is provided at the left side portion or the right side portion and to which the base member fixing portion of the mounting bracket is fixed
      a wire frame, and
      a fixing plate, wherein
         the wire frame has a bent portion that extends along two adjacent sides or three sides of the fixing plate,
         the fixing plate is fixed to the bent portion of the wire frame, and
         the bracket fixing portion is provided at the fixing plate.

2. The side airbag device according to claim 1, wherein the inflator fixing portion is located closer, than the base member fixing portion, to the interior surface.

3. The side airbag device according to claim 1, wherein the base member fixing portion is located farther, than the inflator, away from the interior surface.

4. The side airbag device according claim 1, wherein the inflator fixing portion is located closer, than the base member fixing portion, to a center of the base member in a lateral direction.

5. The side airbag device according to claim 1, wherein the inflator comprises a plurality of bolts, and
   wherein the inflator fixing portion comprises a plurality of inflator fixing holes through which the plurality of bolts are disposed, respectively.

6. The side airbag device according to claim 1, wherein the base member fixing portion comprises a plurality of base member fixing holes through which a plurality of fastening members are disposed, respectively.

7. The side airbag device according to claim 1, wherein the base member comprises an inner portion located laterally farther inward within the vehicle body relative to the airbag, and
   wherein the mounting bracket is fixed to the inner portion.

8. The side airbag device according to claim 1, wherein the wire frame is made of a metal rod,
   the fixing plate is made of a metal plate, and the bent portion includes an L-shaped portion or a U-shaped portion to which the fixing plate is welded.

9. The side airbag device according to claim 1, further comprising a cushion pad with which the base member is covered.

10. A method for manufacturing a side airbag device according to claim 1, the method comprising:
   forming a cushion pad integrally with the base member;
   fixing the base member to the vehicle body; and
   fixing, to the base member, the mounting bracket to which the inflator is fixed.

* * * * *